United States Patent
Brunstein et al.

(10) Patent No.: US 6,594,911 B2
(45) Date of Patent: Jul. 22, 2003

(54) LONG-TERM NAVIGATION METHOD AND DEVICE

(75) Inventors: Etienne Brunstein, Eragny (FR); François Neytard, Eragny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/135,848

(22) Filed: May 1, 2002

(65) Prior Publication Data

US 2003/0014874 A1 Jan. 23, 2003

(30) Foreign Application Priority Data

May 3, 2001 (FR) .......................................... 01 05915

(51) Int. Cl.$^7$ .............................................. G01C 19/00
(52) U.S. Cl. .............................. 33/318; 33/320; 33/324; 33/321; 33/328; 33/329; 33/330
(58) Field of Search ......................... 33/318, 320, 319, 33/324, 328, 329, 330, 321

(56) References Cited

U.S. PATENT DOCUMENTS

| | | | | |
|---|---|---|---|---|
| 2,637,914 A | * | 5/1953 | Rawlings | 33/321 |
| 3,122,842 A | * | 3/1964 | Wrigley et al. | 33/322 |
| 3,426,592 A | * | 2/1969 | Broxmeyer et al. | 33/318 |
| 3,633,003 A | * | 1/1972 | Talwani | 33/318 |
| 3,731,543 A | * | 5/1973 | Gates | 33/318 |
| 3,858,328 A | * | 1/1975 | La Rose | 33/319 |
| 4,914,291 A | * | 4/1990 | Kan et al. | 33/318 |
| 5,331,578 A | * | 7/1994 | Stieler | 33/318 |
| 5,396,326 A | * | 3/1995 | Knobbe et al. | 33/321 |
| 5,406,858 A | | 4/1995 | Brainard | |
| 6,049,989 A | * | 4/2000 | Lee | 33/318 |

FOREIGN PATENT DOCUMENTS

| | | |
|---|---|---|
| DE | 19824904 | 11/1998 |
| GB | 1079310 | 8/1967 |

* cited by examiner

*Primary Examiner*—Diego Gutierrez
*Assistant Examiner*—Amanda J Hoolahan
(74) *Attorney, Agent, or Firm*—Larson & Taylor, PLC

(57) ABSTRACT

Using an inertial master box mounted on a carrier for measuring its movements with respect to a geographic frame of reference of fixed directions along three axes Xg, Yg, Zg, a measuring method provides for continuously measuring an orientation of a frame of reference Xm, Ym, Zm tied to the inertial master box. Positioning is provided by applying a sequence of cycles of eight inversions of the inertial master box while keeping the axis Ym in a direction parallel to the axis Yg. A first motor causes a gimbal to pivot on a first axle secured to the carrier, while a second motor causes the inertial master box to pivot about a second perpendicular axle secured to the gimbal. A processor calculates three attitude angles by running a first inertial navigation program of the strapdown type and controls the first and second motors by running a second program.

7 Claims, 3 Drawing Sheets

LONG-TERM NAVIGATION METHOD AND DEVICE

FIELD OF THE INVENTION

The field of the invention is that of the long-term navigation of a carrier using an inertial navigation unit.

Various types of carrier such as aircraft, ships or land vehicles are known, whose navigation entails knowing the position, the speed and the attitude (heading, roll and pitch).

BACKGROUND OF THE INVENTION

A modern inertial navigation unit generally comprises inertial sensors such as gyrometers and accelerometers which are fixed securely to the carrier (a unit known as a strapdown unit).

The gyrometers measure angular rotations and allow the control of an analytical platform that has to remain fixed in a geographic frame of reference. The accelerometers measure accelerations, which measurements are projected onto this analytical platform and then integrated a first time, to give the speed, then a second time to give the position. The attitude is obtained by extracting the three angles that convert from the frame of reference of the carrier to the frame of reference of the analytical platform.

The precision of an inertial navigation unit depends directly on the errors of the inertial sensors (gyrometers and accelerometers) and more specifically on the projection of these errors into the local geographic frame of reference.

For a strapdown navigation unit, the projection of these errors depends essentially on the path of the carrier, and can therefore not be controlled.

The precision of a strapdown navigation unit is therefore limited by the intrinsic precision of these sensors. In the case of long-term inertial navigation, the position errors depend in particular on the precision of the gyrometers.

SUMMARY OF THE INVENTION

In order to improve the long-term navigation precision of a strapdown inertial unit, the subject of the invention is a method of navigation by means of a strapdown inertial master box mounted on a mechanical device that allows this master box to be placed in various successive positions so as to average out the gyrometer errors projected into the local geographic frame of reference.

The attitude information output from the strapdown inertial unit allows the mechanical device to be controlled directly so as to successively place the master box in various positions which are practically fixed with respect to the local geographic frame of reference.

More specifically, the subject of the invention is a long-term navigation method using an inertial master box with which there is associated a tied frame of reference of axes Xm, Ym, Zm, mounted on a carrier for measuring its movements with respect to a geographical frame of reference of fixed directions along three axes Xg, Yg, Zg, characterized in that it comprises:
  measurement actions consisting in constantly measuring, by means of the inertial master box, an orientation of the tied frame of reference in the geographical frame of reference;
  positioning actions which consist in applying a sequence of cycles of eight turnings-over of the inertial master box each of which keeps the axis Ym in a direction parallel to the axis Yg, a succession of two turnings-over about the axis Xm being preceded and followed by a turning-over about the axis Zm, a succession of two turnings-over about the axis Zm being preceded and followed by a turning-over about the axis Xm.

The positioning actions make it possible to compensate for the measurement errors by inverting the sign along the axis Ym on each turning-over, by inverting the sign along the axis Xm on each turning-over about the axis Zm and by inverting the sign along the axis Zm on each turning-over about the axis Xm.

The measurement actions constantly taken then make it possible to compensate mutually for the errors on each of the axes Xm, Ym, Zm of the tied frame of reference so as to reduce the projections of errors onto the axes Xg, Yg, Zg by averaging out their contributions over one cycle.

A further subject of the invention is a long-term navigation device using an inertial master box mounted on a carrier to measure its movements with respect to a frame of reference of fixed directions along three axes Xg, Yg, Zg, characterized in that it comprises a first motor for causing a gimbal to pivot on a first axle secured to the carrier, a second motor for causing the inertial master box to pivot on a second axle perpendicular to the first axle and secured to the gimbal, and a processor for controlling the first and second motors by running a program which applies a sequence of cycles of eight turnings-over of the inertial master box each of which keeps an axis Ym tied to the inertial master box in a direction parallel to the axis Yg, a succession of two turnings-over about the first axle being preceded and followed by a turning-over about the second axle, a succession of two turnings-over about the second axle being preceded and followed by a turning-over about the first axle.

The first motor allows the inertial master box to be kept in a plane containing the axis Yg so as to make any position of the inertial master box insensitive to the changes in heading of the carrier. The second motor allows the axis Ym to be kept horizontal.

BRIEF DESCRIPTION OF THE DRAWINGS

These and other aspects of the invention will be made more apparent in the following detailed description of the invention read in conjunction with the accompanying drawing wherein.

DESCRIPTION OF PREFERRED EMBODIMENTS

Figure 1:
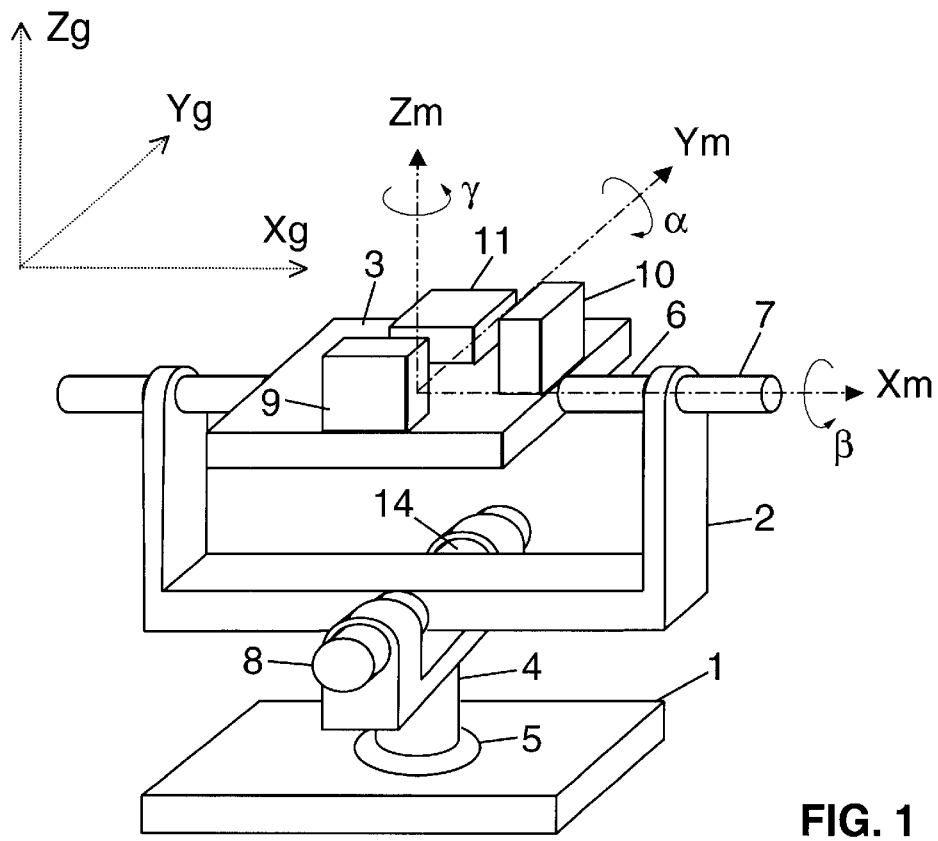
FIG. 1 shows the device according to the invention in a particular initial position.

With reference to FIG. 1, a platform 1 is secured to a carrier such as a ship for example. The platform 1 supports a gimbal 2 for keeping three axes Xm, Ym, Zm of a frame of reference tied to an inertial master box 3, in directions which are roughly parallel to three axes Xg, Yg, Zg of a fixed geographic frame of reference. The axes Xg and Yg are oriented in the horizontal plane towards the north and towards the west respectively, and the axis Zg is oriented vertically upward.

A first degree of freedom in rotation is given by an axle 4 secured to the carrier. A motor 5 allows the axle 4 to be turned in such a way as to cancel the effects of the variations in heading of the carrier.

A second degree of freedom in rotation is given by an axle 6, secured to the inertial master box 3. A motor 7 allows the axle 6 to be turned in such a way as to cancel the effects of rotation of the carrier about the axle 6. Thus, a combination of rotations of the axles 4 and 6 allows the axis Ym to be kept constantly in a direction approximately parallel to the axis Yg.

A third degree of freedom in rotation is given by a third axle 14, perpendicular to the axle 4 and to the axle 6. A motor 8 allows the third axle 14 to be turned in such a way as to cancel the rotations of the carrier about the axle 14. Thus, a combination of rotations of the axles 4 and 14 allows the axis Xm to be kept constantly in a direction approximately parallel to the axis Xg.

When the axes Xm and Ym are kept in a direction parallel to the axes Xg and Yg respectively, the axle Zm is kept in a direction parallel to the axis Zg.

The inertial master box 3 comprises three sensors 9, 10, 11 each of which performs the function of a gyrometer and of an accelerometer. The sensor 9 measures the accelerations of the inertial master box 3 in the direction of the axis Ym and the rotations of the inertial master box 3 about the axis Ym. The sensor 10 measures the accelerations of the inertial master box 3 in the direction of the axis Xm and the rotations of the inertial master box 3 about the axis Xm. The sensor 11 measures the accelerations of the inertial master box 3 in the direction of the axis Zm and the rotations of the inertial master box 3 about the axis Zm.

The gyrometer functions of the sensors 9, 10, 11 make it possible to measure the angles of rotation of the inertial master box 3 with respect to each of the three axes Xg, Yg, Zg. It is then possible to calculate the angles of rotation of the carrier by deduction from the measured angles of rotation.

The accelerometer functions of each of the sensors 9, 10, 11 make it possible to measure the acceleration of the inertial master box in each of the directions along the axes Xm, Ym, Zm. It is then possible to calculate accelerations of the carrier along the axes Xg, Yg, Zg of the geographic frame of reference by deduction from the measured accelerations, then by integrating to give the speed, and double integrating to give the position of the carrier in the geographic frame of reference Xg, Yg, Zg.

Each of the angle measurements made by the sensors 9, 10, 11 is affected by errors of drift, scale factor and axis alignment.

The drift error results in an offset of the origin of the measurement, which means that a null magnitude is not always measured at zero. This offset is generally constant across the entire measurement range. The value of the drift error is denoted Dx on the axis Xm, Dy on the axis Ym and Dz on the axis Zm.

The scale factor error is the error on the factor by which the measurement is multiplied. The scale factor error is denoted Fx on the axis Xm, Fy on the axis Ym and Fz on the axis Zm.

The alignment errors result from the fact that the three axes Xm, Ym, Zm are not perfectly orthogonal. The orthogonality error between the axes Xm and Ym is denoted Cxy, the orthogonality error between the axes Ym and Zm is denoted Cyz, and the orthogonality error between the axes Zm and Xm is denoted Czx.

To reduce the effect that these errors have on the precision of the navigation, the inertial master unit 3 is periodically turned over so as to change the sign of the error. Thus, by averaging out the projections of the various measurement errors in the local geographic frame of reference Xg, Yg, Zg, a positive error build-up is reduced by a negative error build-up over an integration time which is identical for measurements of opposite signs.

Turning the sensors over is performed by rotating the axles 4 and 6. The rotation values that make it possible to average out the errors with a minimum of elemental positions are rotations by $+\pi$ or $-\pi$ about the various axes.

Starting out from an initial position as depicted in FIG. 1, a first possible rotation is the one given by the pair $[\gamma(0), \beta(0)]$, that is to say the one corresponding to a zero rotation. The orientation of the sensors and therefore the orientation of the errors are maintained.

Figure 2:
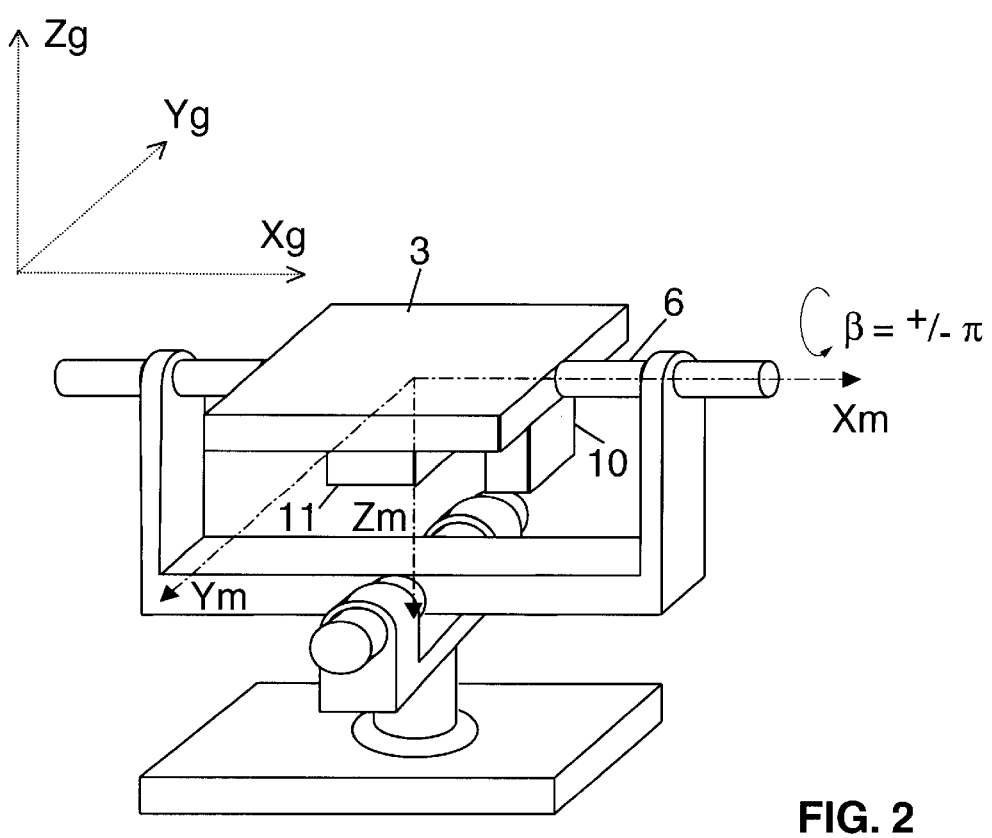
FIGS. 2 to 5 each show the device in a position after possible rotation to implement the method according to the invention.

A second and third possible rotation are those given by the pairs $[\gamma(0), \beta(+\pi)]$ and $[\gamma(0), \beta(-\pi)]$. The final result, which is identical for each of these rotations, is depicted in FIG. 2. Only the direction of rotation of the angle $\beta$ changes, having a different influence in a transient state when passing from an initial position to the final position.

With reference to FIG. 2, the inertial master box 3 has been turned over by rotation through 180°, that is to say $\pi$ radians, of the axle 6 so that the sensors are now on the underside of the inertial master box 3. The sensor 10 remains oriented to take measurements along the axis Xm, without any change of sign of the errors relative to the axis Xg. The sensor 11 remains oriented to take measurements along the axis Zm, with a change in the sign of the errors relative to the axis Zg. The sensor 9 is no longer visible because it is concealed by the volume of the inertial master box 3. It will be readily understood that the sensor 9 remains oriented to take measurements along the axis Ym, with a change in sign of the errors relative to the axis Yg. An error which adds to (or subtracts from) the measurement of the sensors 9 and 11 in their configuration of FIG. 1 is now subtracted from (or added to) the measurement from the sensors 9 and 11 in their configuration of FIG. 2. An error which adds to (or subtracts from) the measurement from the sensor 10 in its configuration of FIG. 1, continues to add to (or subtract from) the measurement from the sensor 10 in its configuration of FIG. 2.

Figure 3:
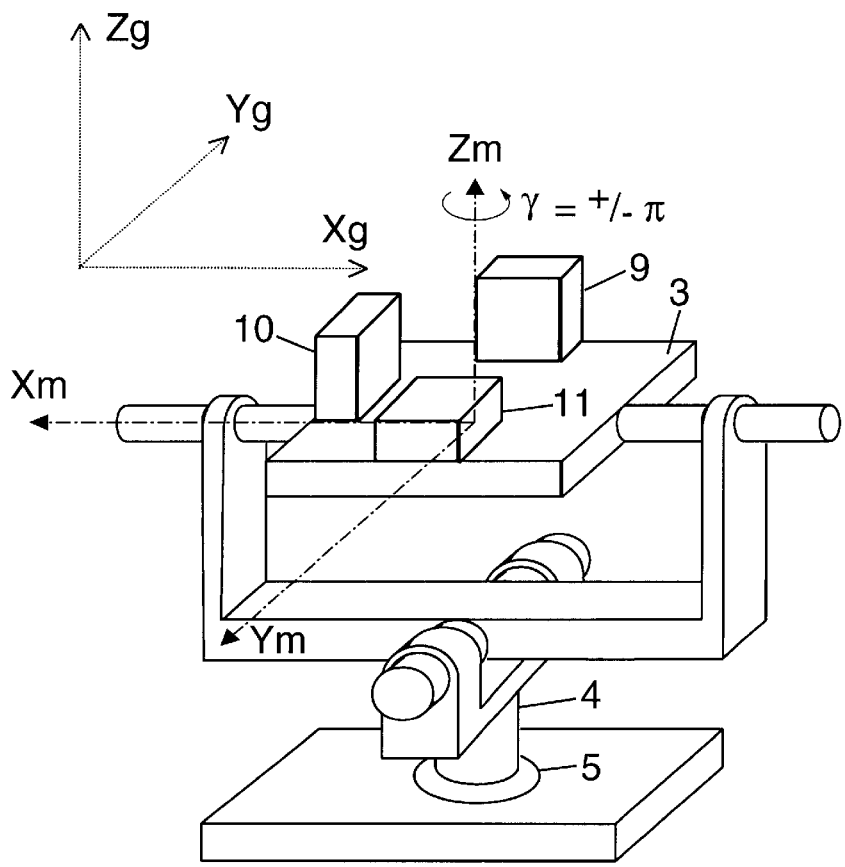

A fourth and fifth possible rotation are those given by the pairs $[\gamma(+\pi), \beta(0)]$ and $[\gamma(-\pi), \beta(0)]$. The final result, which is identical for each of these rotations, is depicted in FIG. 3, starting from FIG. 1 as the initial position. It will be readily understood that the result would differ if the starting point were some other initial position such as the one depicted in FIG. 2.

With reference to FIG. 3, the inertial master box 3 has been turned over by rotation through 180° of the axle 4 such that the sensors remain on the upper face of the inertial master box 3. The sensor 10 remains oriented to take measurements along the axis Xm, with a change in sign of the projections of errors onto the axis Xg. The sensor 11 remains oriented to take measurements along the axis Zm, without a change of sign of the projections of errors onto the axis Zg. The sensor 9 remains oriented to take measurements along the axis Ym, with a change of sign of the projections of errors onto the axis Yg. An error which adds to (or subtracts from) the measurement from the sensors 9 and 10 in their initial configuration is subtracted from (or added to) the measurement from the sensors 9 and 10 in their final configuration. An error which adds to (or subtracts from) the measurement from the sensor 11 in its initial configuration continues to add to (or subtract from) the measurement from the sensor 11 in its final configuration.

In the method according to the invention, a succession of rotations chosen from the five mentioned previously is applied cyclically to the inertial master box 3, in programmed sequences of rotation of the axles 4 and 6 by means of the motors 5 and 7. To invert the sign of the projections of each error onto the axes of the local geographic frame of reference Xg, Yg, Zg, four rotations will suffice. Two rotations about the axis Xm invert and return to their initial position the projections of errors relative to the axes Yg and Zg. Two rotations about the axis Zm invert and return to their initial position the projections of errors relative to the axes Zg and Xg. However, the rotations themselves give rise to errors, mainly under the effect of scale factor errors and axis alignment errors. In order to average out the errors introduced by the turnings-over themselves, each cycle is made up of a series of eight rotations which, at the end of the cycle, place the inertial master box 3 back in the initial position it had at the beginning of the cycle. Each choice of rotation in the series can be made from among the five rotations mentioned previously. There are therefore $5^8$, namely 390 625 potential series of rotations in one cycle.

Among all the potential series, nine basic series have been selected in order to simultaneously reduce the effects of drift, scale factors and misalignment. Over one cycle, the duration $\Delta t$ of a rotation to change from an initial position to a final position is identical for each rotation in the series. Typically, the duration $\Delta t$ is a few seconds. At the end of each rotation, the inertial master box 3 is kept in its final position for a length of time equal to one eighth of the cycle time Tc, to within $\Delta t$, before undergoing the next rotation in the series, for which the initial position is the final position of the previous rotation. Typically, a cycle time is several minutes. At the end of a cycle, a fresh cycle of rotations is performed with the same series as in the previous cycle or with a different series chosen on the basis of the nine series proposed.

The nine basic series are given in Table 1, the first row of which references the eight rotations Rot1 to Rot8 of a cycle. The second row gives the positions of the inertial master box at the beginning and at the end of each rotation with respect to the local geographic frame of reference Xg, Yg, Zg. Xn indicates that the axis Xm is directed towards north. Xs indicates that the axis Xm is directed towards the south. Yw indicates that the axis Ym is directed towards the west. Ye indicates that the axis Ym is directed towards the east. Zu indicates that the axis Zm is directed up. Zd indicates that the axis Zm is directed down. The next rows identify the series S1 to S9 where $\gamma(+\pi)$ indicates a rotation by $+\pi$ radians about the axis Zm, $\gamma(-\pi)$ indicates a rotation by $-\pi$ radians about the axis Zm. Likewise, $\beta(+\pi)$ indicates a rotation by $+\pi$ radians about the axis Xm, $\beta(-\pi)$ indicates a rotation by $-\pi$ radians about the axis Xm.

TABLE 1

| Pos. | Rot1<br>P1<br>Xn<br>Yw<br>Zu | Rot2<br>P2<br>Xs<br>Ye<br>Zu | Rot3<br>P3<br>Xs<br>Yw<br>Zd | Rot4<br>P4<br>Xn<br>Ye<br>Zd | Rot5<br>P3<br>Xs<br>Yw<br>Zd | Rot6<br>P2<br>Xs<br>Ye<br>Zu | Rot7<br>P1<br>Xn<br>Yw<br>Zu | Rot8<br>P4<br>Xn<br>Ye<br>Zd | P1<br>Xn<br>Yw<br>Zu |
|---|---|---|---|---|---|---|---|---|---|
| S1 | γ (+π) | β (+π) | γ (+π) | γ (−π) | β (+π) | γ (−π) | β (+π) | β (+π) | |
| S2 | γ (+π) | β (+π) | γ (+π) | γ (−π) | β (−π) | γ (−π) | β (+π) | β (−π) | |
| S3 | γ (+π) | β (+π) | γ (+π) | γ (−π) | β (−π) | γ (−π) | β (−π) | β (+π) | |
| S4 | γ (+π) | β (+π) | γ (−π) | γ (+π) | β (+π) | γ (−π) | β (+π) | β (+π) | |
| S5 | γ (+π) | β (+π) | γ (−π) | γ (+π) | β (−π) | γ (−π) | β (+π) | β (−π) | |
| S6 | γ (+π) | β (+π) | γ (−π) | γ (+π) | β (−π) | γ (−π) | β (−π) | β (+π) | |
| S7 | γ (+π) | β (+π) | γ (−π) | γ (−π) | β (+π) | γ (+π) | β (+π) | β (+π) | |
| S8 | γ (+π) | β (+π) | γ (−π) | γ (−π) | β (−π) | γ (+π) | β (+π) | β (−π) | |
| S9 | γ (+π) | β (+π) | γ (−π) | γ (−π) | β (−π) | γ (+π) | β (−π) | β (+π) | |

What these series have in common is that all the rotations involve a turning-over, that is to say a rotation through $\pi$ radians (180°). It can be seen that there is a turning-over in a plane perpendicular to the axis Zm, followed by a turning-over in a plane perpendicular to the axis Xm, followed by two turnings-over in the plane perpendicular to the axis Zm, followed by a turning-over in the plane perpendicular to the axis Xm, followed by a turning-over in the plane perpendicular to the axis Zm, followed by two turnings-over in the plane perpendicular to the axis Xm.

Considering a succession of two turnings-over Rot7, Rot8, about the axis Xm, this is preceded by a turning-over Rot6 and followed by a turning-over Rot1 of the next cycle, about the axis Zm. Considering a succession of two turnings-over Rot3, Rot4 about the axis Zm, this is preceded by a turning-over Rot 2 and followed by a turning-over Rot 5 about the axis Xm.

Thus, the projections of errors onto the axis Zg are of a first sign in the first time interval preceding the first turning-over, of the opposite sign over the three time intervals preceding the fifth turning-over, of the first sign again over the two time intervals preceding the seventh turning-over, of the opposite sign in the time interval preceding the eighth turning-over and of the same sign again in the time interval succeeding the eighth turning-over. The projections of errors onto the axis Zg are of a first sign in four time intervals and of the opposite sign over four time intervals. The mean of the projections of errors onto the axis Zg tends to cancel itself out over one cycle.

The projections of errors onto the axis Xg, initially of a first sign before the first turning-over, are of the opposite sign over the two time intervals which precede the third turning-over, of the first sign again in the time interval preceding the fourth turning-over, of the opposite sign over the two time intervals preceding the sixth turning-over, of the first sign again over the two time intervals preceding the eighth turning-over and of the first sign again in the time interval succeeding the eighth turning-over. The projections of errors onto the axis Xg are of the first sign over four time intervals and of the opposite sign over four time intervals. The mean of the projections of errors onto the axis Xg tends to cancel itself out over one cycle.

The projections of errors onto the axis Yg change sign on each turning-over. The errors on the axis Yg, which alternate between the first sign and the opposite sign, therefore tend to cancel each other out over one cycle.

Programmed sequences are run by a processor, preferably a high-speed processor, which controls the motors 5 and 7 in a known way to carry out the turnings-over.

While the projections of errors compensate for each other on the whole over the intervals of a cycle, in which the inertial master box is kept in a stable position between two rotations, the projections of errors do not compensate for each other necessarily during rotations. For each duration $\Delta t$, a rotation gives rise to residual angle measurement errors due essentially to errors in scale factor and in the alignment of the axes of the gyrometers. The manufacturing and mounting tolerances on the gyrometers make it possible to estimate the values of the drift errors Dx, Dy, Dz, of the scale factors Fx, Fy, Fz and of the axis alignment errors Cyz, Czx, Cxy. It is then possible to calculate the residual errors by integrating, over each duration $\Delta t$ of a rotation, error calculation formulae known to those skilled in the art. By summing each type of residual error projection over all the durations $\Delta t$ of the rotations of a cycle and dividing the result obtained by the total cycle time, a mean of each type of error projection over one cycle is obtained. By applying a succession of cycles such as described previously, the calculated residual error terms which arise on the various axes are given by Table 2 below:

TABLE 2

|  | Drift | Scale factor | Axis alignment |
| --- | --- | --- | --- |
| Mean of errors projected onto Xg | $kdx \cdot \dfrac{\Delta t}{T\,cycle} \cdot D_x$ | $kfx \cdot \Omega \cdot Fx$ | $kcx \cdot \dfrac{\Delta t}{T\,cycle} \cdot \Omega \cdot Cx$ |
| Mean of errors projected onto Yg | $kdy \cdot \dfrac{\Delta t}{T\,cycle} \cdot D_y$ | 0 | $kcy \cdot \dfrac{\Delta t}{T\,cycle} \cdot \Omega \cdot Cy$ |
| Mean of errors projected onto Zg | $kdz \cdot \dfrac{\Delta t}{T\,cycle} \cdot D_z$ | $kfz \cdot \Omega \cdot Fz$ | $kcz \cdot \dfrac{\Delta t}{T\,cycle} \cdot \Omega \cdot Cz$ |

For each series of turning-over, the coefficients kdx, kdy, kdz are constants independent of the drift errors Dx, Dy, Dz, the coefficients kfx, kfz are constants independent of the scale factor errors Fx, Fy, Fz, and the coefficients kcx, kcy, kcz are constants independent of the alignment errors Cyz, Czx, Cxy. The coefficients Cx, Cy, Cz are linear combinations of the alignment errors Cyz, Czx, Cxy.

By choosing the duration $\Delta t$ of a turning-over to be short by comparison with a cycle time Tc, it is possible to obtain a ratio $$\frac{\Delta t}{Tc}$$

which is very small. By observing that the terms Dx, Dy, Dz involving the drifts are multiplied by this ratio, it can be seen that the residual error due to drift is small. Likewise, by observing that the terms Cx, Cy, Cz involving the misalignments are multiplied by this ratio and by the rate $\Omega$ at which the Earth is spinning, it can be seen that the residual error due to misalignment is small. It is seen that the error due to the scale factors Fx, Fz is not degraded under the effect of the turnings-over of the inertial master box 3. By observing that the scale factors Fx, Fz are multiplied by the rate $\Omega$ at which the Earth is spinning, it can be seen that the residual error due to scale factors is smaller than in a configuration in which the inertial master box 3 is strapped down onto the carrier without the gimbals. This is because the rate $\Omega$ at which the Earth is spinning is low by comparison with the movements of the carrier, particularly the movements in terms of heading. Furthermore, no error is proportional to the speed of the turnings-over, which can thus be increased, so as to reduce the ratio $$\frac{\Delta t}{Tc}.$$

These remarkable properties apply to the constant values over a turning-over cycle. In the first order, these properties are maintained for magnitudes which vary slowly with respect to the duration of the cycle.

By virtue of the mechanism described previously and of the turning-over cycles, the influence of the various error terms is reduced significantly. In consequence, the long-term stability of the gyrometers is no longer a decisive factor in these applications.

The teaching of the invention is not restricted to gyrometers and applies even to accelerometers. The elemental errors in the accelerometers (bias, scale factors and axis alignment) are also averaged out by projection into the local geographic frame of reference.

The abovementioned method, applied for placing the inertial master box 3 in a succession of notable fixed positions with respect to the local geographic orthonormal frame of reference G determined by the axes Xg, Yg, Zg makes it possible to extend to long-term applications gyrometers and/or accelerometers which are normally used within units strapped down to the carrier, over shorter periods of time.

The invention is not restricted to the exemplary embodiment described previously. The same results are obtained by inverting the direction of all the rotations through the angle $\gamma$ and/or by inverting the direction of all the rotations through the angle $\beta$, that is to say by replacing, in the series, $\gamma(+\pi)$ by $\gamma(-\pi)$ and vice versa and/or $\beta(+\pi)$ by $\beta(-\pi)$ and vice versa. Likewise, the properties obtained remain unchanged by circular permutation of the order of the turnings-over, the nine basic solutions are identical if they are run in their entirety from one of the second to eighth turnings-over, ending with the turning-over before as mentioned in the description.

Figure 4:
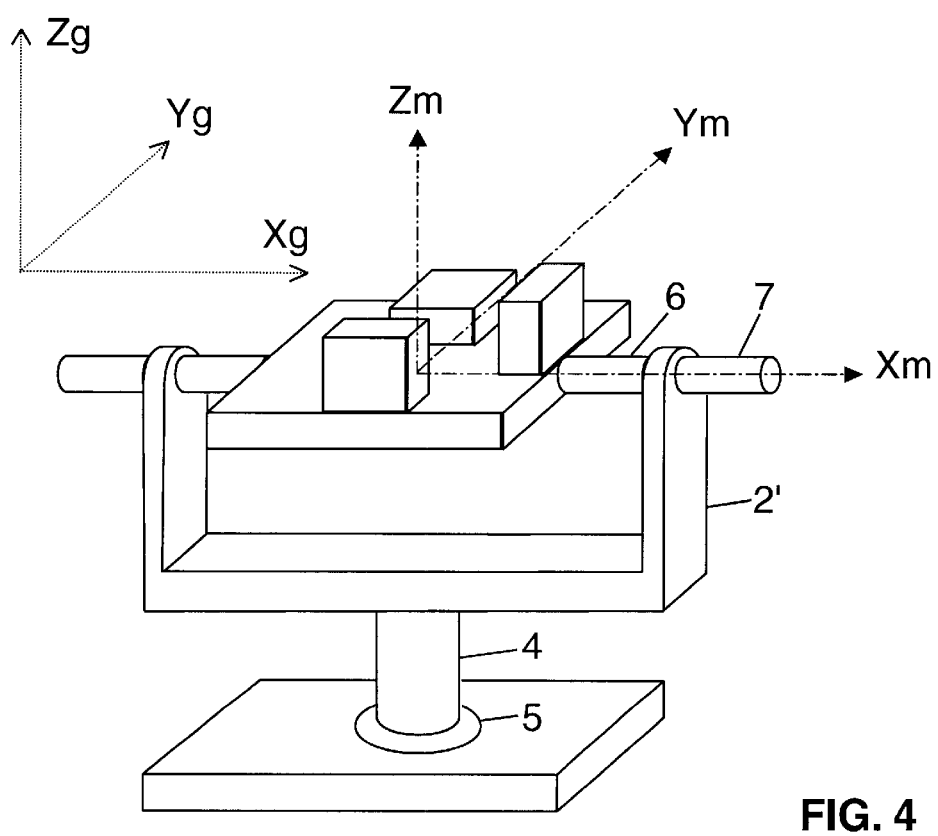

With reference to FIG. 4, the gimbal with three rotation axles is replaced by a gimbal 2' with two rotation axles 4 and 6. Here only the vertical axle 4 in Zm and the horizontal axle 6 in Xm have been kept. This simplified set-up allows the previously mentioned turnings-over to be performed with the same motors 5 and 7.

Figure 5:
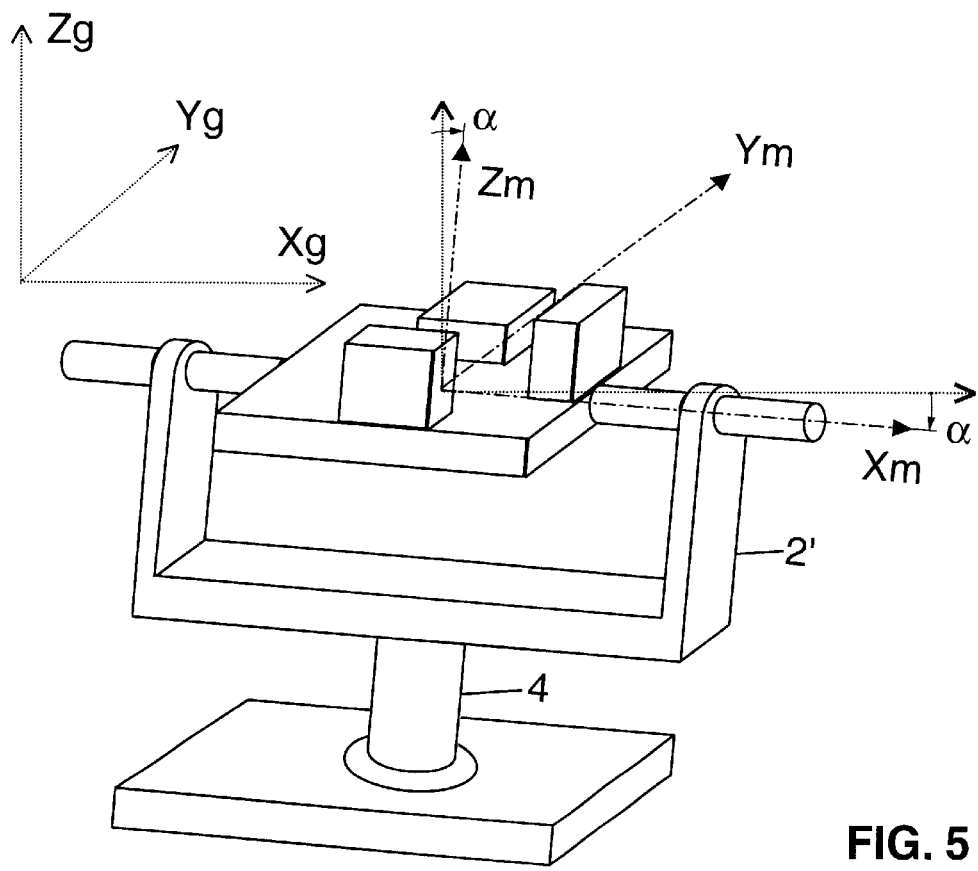

As can be seen in FIG. 5, the gimbal 2' does not make it possible to compensate for a divergence of an angle α of the axes Xm and Zm with respect to the axis Xg and the axis Zg respectively. However, it is still possible by combining rotations about the axis Xm and the axis Zm, to keep the axis Ym in a direction parallel to the axis Yg. The increase in the mean of the projections of error relative to the axes Xg and Zg remains small as long as the angle α remains small. Furthermore, in the case, for example, of a ship, the axes Xm and Zm generally fluctuate with a fairly constant amplitude and frequency that makes it possible, to a first approximation, to consider that the axes Xm and Zm are, on average over one cycle, parallel to the axes Xg and Zg respectively.

Figure 6:
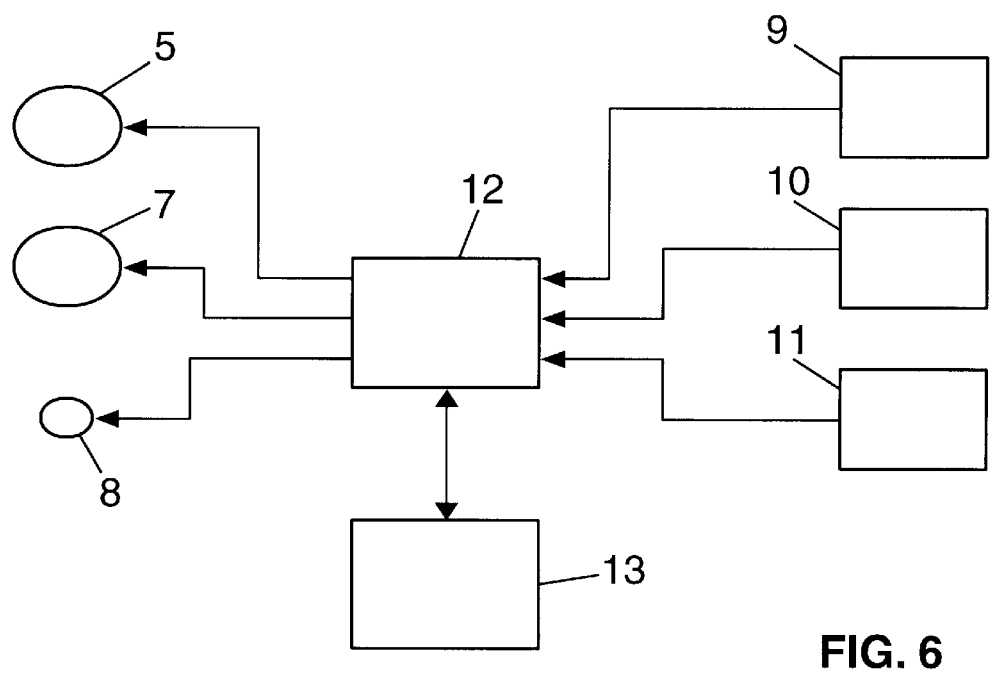
FIG. 6 is a control diagram of the device according to the invention.

With reference to FIG. 6, a processor 12 receives the measurements from the sensors 9, 10, 11 and calculates, by means of these measurements, three attitude angles by running a first inertial navigation program of strapdown type. A first attitude angle is the angle α by which the axes Zm, Xm diverge from the axes Zg, Xg in one and the same plane. A second attitude angle is the angle β by which the axes Ym, Zm diverge from the axes Yg, Zg in one and the same plane. A third attitude angle is the angle γ by which the axes Xm, Ym diverge from the axes Xg, Yg in one and the same plane.

The processor 12 controls at least the motors 5 and 7 by running a second program contained in a memory 13. The program takes the attitude angles calculated by the first program into account to slave the inertial master box 3 to each stable position.

The program has the basic series described previously for performing the turnings-over in the cycles according to the method of the invention.

By turning the motors 5 and 7 through an angle of 180° in a cycle according to the method of the invention, the program makes it possible to cause the projections of errors on the three axes Xg, Yg and Zg to participate in one direction and in the opposite direction alternately, so as to cancel out these error projections on average over a cycle.

When the processor 12 controls just the motors 5 and 7, it can be allowed for small amplitude alternating rotations about the axis Ym to compensate for the errors in one direction and the other on average over each stable position time interval and on average over one cycle.

The device is further improved when the processor 12 controls the motor 8 by running the program specially designed for that purpose so as to keep the inertial master box 3 in each stable position along the axis Yg and in addition also along the axes Xg and Zg.

What is claimed is:

1. A long-term navigation method using an inertial master box (3) with which there is associated a tied frame of reference of axes Xm, Ym, Zm, mounted on a carrier for measuring its movements with respect to a geographical frame of reference of fixed directions along three axes Xg, Yg, Zg, comprising:

measurement actions consisting in constantly measuring, by means of the inertial master box, an orientation of the tied frame of reference in the geographical frame of reference;

positioning actions which consist in applying a sequence of cycles of eight turnings-over of the inertial master box each of which keeps the axis Ym in a direction parallel to the axis Yg, a succession of two turnings-over about the axis Xm being preceded and followed by a turning-over about the axis Zm, a succession of two turnings-over about the axis Zm being preceded and followed by a turning-over about the axis Xm.

2. The long-term navigation method according to claim 1, wherein a cycle comprises a turning-over in a first plane, followed by a turning-over in a second plane, followed by two turnings-over in the first plane, followed by one turning-over in the second plane, followed by one turning-over in the first plane, followed by two turnings-over in the second plane.

3. The long-term navigation method according to claim 2, wherein the first plane is perpendicular to the vertically-directed Z-axis and in that the second plane is perpendicular to the Y-axis.

4. The long-term navigation method according to claim 1, comprising actions for keeping the axes Xm, Ym, Zm in directions parallel to the axes Xg, Yg, Zg.

5. A long-term navigation device using an inertial master box mounted on a carrier to measure its movements with respect to a frame of reference of fixed directions along three axes Xg, Yg, Zg, comprising:

a first motor provided for causing a gimbals to pivot on a first axle secured to the carrier;

a second motor provided for causing the inertial master box to pivot on a second axle perpendicular to the first axle and secured to the gimbals;

a processor provided for calculating three angles of attitude by running a first inertial-navigation program of strapdown type and for controlling the first and second motors by running a second program which, using the calculated attitude angles, places the inertial master box in a succession of stable angular positions with respect to the said frame of reference of fixed directions, in a sequence of cycles of eight turnings-over of the inertial master box in at least two perpendicular planes, each of constant orientation in the frame of reference of fixed directions.

6. The long-term navigation device according to claim 5, wherein the program executes one turning-over in a first plane, followed by one turning-over in a second plane, followed by two turnings-over in the first plane, followed by one turning-over in the second plane, followed by one turning over in the first plane, followed by two turnings-over in the second plane.

7. The long-term navigation device according to claim 5, comprising a third motor provided for causing the inertial master box to pivot about a third axle perpendicular to the first and to the second axles under the control of the processor and wherein the program makes turning the motors in such a way as to keep the inertial master box in a fixed plane of the frame of reference of fixed directions Xg, Yg, Zg for each stable position of the inertial master box.

\* \* \* \* \*